Oct. 27, 1925.
J. R. CARSON
1,559,159
TELEGRAPH SIGNALING SYSTEM
Filed July 7, 1920
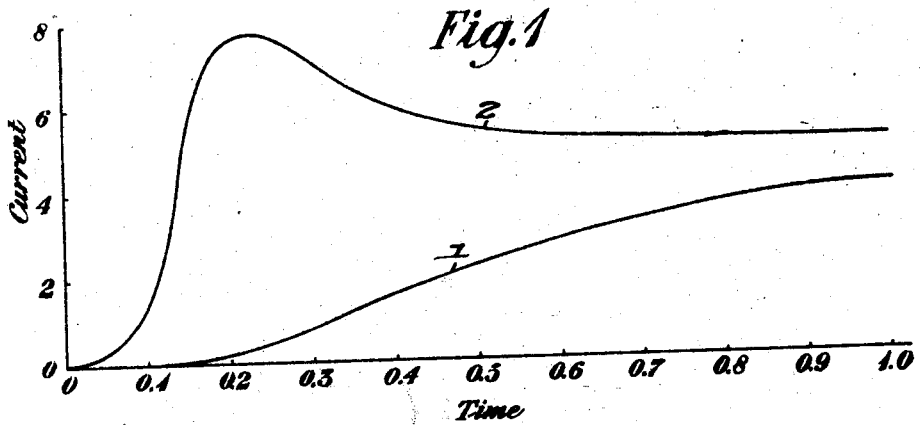
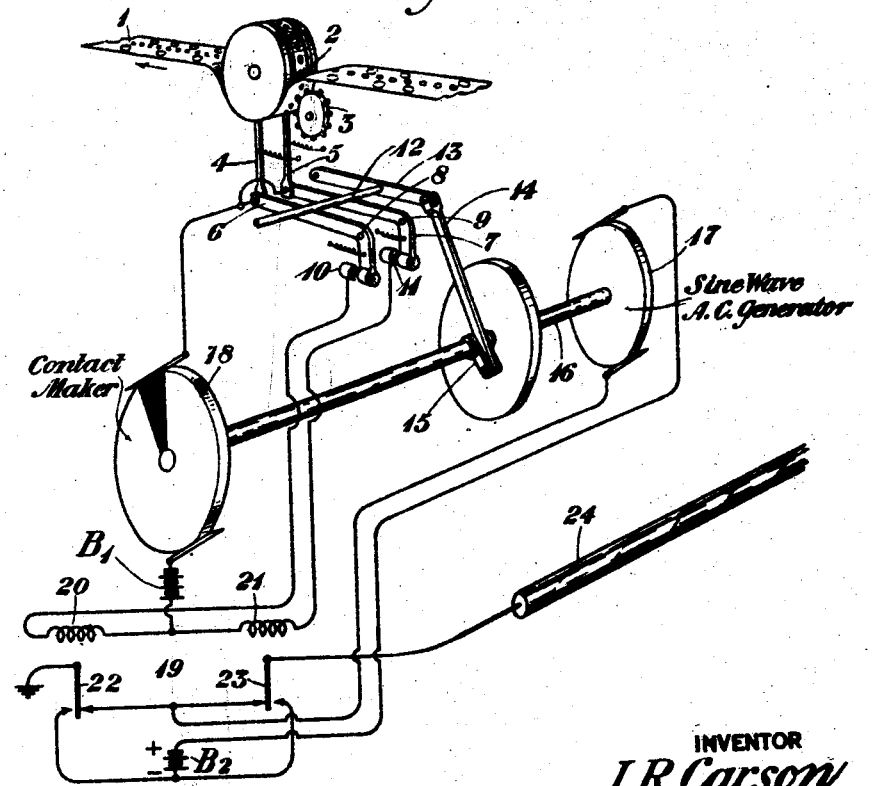
INVENTOR
J. R. Carson
BY
ATTORNEY Patented Oct. 27, 1925.

1,559,159

UNITED STATES PATENT OFFICE.

JOHN R. CARSON, OF MONTCLAIR, NEW JERSEY, ASSIGNOR TO AMERICAN TELEPHONE AND TELEGRAPH COMPANY, A CORPORATION OF NEW YORK.

TELEGRAPH SIGNALING SYSTEM.

Application filed July 7, 1920. Serial No. 394,510.

*To all whom it may concern:*

Be it known that I, JOHN R. CARSON, residing at Montclair, in the county of Essex and State of New Jersey, have invented certain Improvements in Telegraph Signaling Systems, of which the following is a specification.

This invention relates to telegraph signaling systems, and especially to a system for correcting distortion which consists in applying to a signaling circuit impulses comprising a sine wave superimposed on a direct current voltage, which impulses, when distorted by transmission over the said circuit will have the desired predetermined form of an arrival wave.

It is well known that in signaling over long submarine cables the speed is limited largely by the distortion and the attenuation of the impressed wave, and that various methods have been suggested to overcome these objections. Thus in the copending application of Carson, Serial No. 240,631, filed June 18, 1918, is shown a method for correcting the distortion of the received wave resulting from the characteristics of the circuit, and for amplifying the corrected wave before impressing it upon the receiving apparatus.

It is the object of this invention to disclose a method of determining the correct shape of the wave to be applied and means for applying said wave to a circuit such as a submarine cable in order to assure the arrival at the receiving end of such cable of a wave having the correct form for impressing upon the receiving apparatus.

This invention will be more clearly understood from the following description when read in connection with the attached drawing of which curve 1 of Figure 1 represents the arrival current which results from impressing upon a submarine cable simply a unit direct current voltage, while curve 2 represents the improved form of the arrival current which may be obtained by impressing upon the cable a sinusoidal voltage superimposed on a direct current voltage, and Fig. 2 shows the manner in which the well known tape transmitter may be adapted to apply the signaling impulse to the circuit when the alternating current voltage is in proper phase relation. To obtain correct values from the scale readings of Fig. 1, the ordinates should be multiplied by 100 to obtain microamperes per volt, and the abscissæ should be multiplied by 0.532 to obtain seconds.

It has been shown in the Carson application heretofore referred to that if the corrected wave is a combination not only of the arrival wave but also of its first two derivatives, the resultant wave form has a fairly steep front and a well sustained maximum value which is effective in actuating the recording mechanism. Such a wave form is shown in Fig. 1, and it is the object of this invention to show how such an arrival wave may be produced by impressing upon the cable a sinusoidal E. M. F. equal to $E \sin(pt+\theta)$ superimposed upon a direct current voltage $v$ provided the constants $E$, $v$, $\theta$ and $p$ are properly adjusted.

If there is applied at any time to the cable a sine wave superimposed upon a direct current voltage the resultant current flowing in said cable is made up of the steady state current and the transient current due to the sinusoidal voltage, and the steady state and transient current due to the direct current applied voltage. Thus the arrival current $I(t)$ at any point $x$ of an infinitely long cable resulting from the application of a sinusoidal voltage $E \sin(pt+\theta)$ superimposed upon the direct current voltage $v$ may be represented by $$I(t) = S(t) + T(t) + vA(t) \qquad (1)$$

where
$S(t)$=steady state current in response to voltage $E \sin(pt+\theta)$
$T(t)$=transient current in response to voltage $E \sin(pt+\theta)$ and
$A(t)$=current due to the unit direct current voltage.

When at time $t=0$ and at point $x=0$ a unit direct current voltage is applied to an infinitely long cable of resistance R and capacity C per unit length (inductance L and leakage G being negligible) the current A$(t)$ at point $x$ and time $t$ is given by the expression $$A(t) = \sqrt{\frac{C}{\pi R}} \frac{e^{-\frac{RCx^2}{4t}}}{\sqrt{t}}$$

This formula is derived in the applicant's paper "Theory of the transient oscillations of electrical networks and transmission systems" published in the Proceedings of the American Institute of Electrical Engineers, vol. 38, pp. 438-444. Since $A(t)$ represents the resultant effect of the steady state and the transient current due to a unit direct current voltage, the resultant effect in response to a direct current voltage $v$ would be $v\,A(t)$ as in eq. (1).

The current at any time $t$ in response to the sinusoidal voltage is represented in eq. (1) by the two parts, $S(t)$, the steady state component and $T(t)$ the transient component which ultimately dies away.

The steady state current $S(t)$ at a distance $x$ from the sending end of an infinitely long cable of resistance R and capacity C per unit length (the inductance L and leakage G being negligible) due to impressing a sinusoidal E. M. F. E sin $(pt+\theta)$ of frequency $p/2\pi$ and phase $\theta$ at time $t=0$) and point $x=0$, is given by $$S(t) = E\frac{\sqrt{2}}{R_o}\sqrt{2ap}\,e^{-\sqrt{2ap}}\sin\left(pt+\theta+\phi+\frac{\pi}{4}\right) \quad\quad (2)$$

in which $a = \dfrac{RCx^2}{4}$ $R_o = Rx$ and $\phi = -\sqrt{2ap}$.

This formula may be verified in any standard treatise on transmission line theory; for example, Fleming on p. 84 of "The Propagation of Electric Currents in Telephone and Telegraph Conductors" (third edition, 1919) gives the symbolic expression for the steady state current, $$I = \frac{E_o}{Z_o}e^{-Px}$$

where $$P = \sqrt{(R+Lpi)\ (G+Cpi)}$$
$$Z_o = \sqrt{(R+Lpi)/(G+Cpi)}$$
$$i = \sqrt{-1}$$

and $E_o$ is a periodic E. M. F. applied at the sending end. When this is rationalized by the usual methods of complex algebra and L and G are put equal to zero, it is equivalent to the real expression given above. This expression (eq. (2)) then represents the steady state current at any instant $t$ in response to the sinusoidal or simple periodic E. M. F., E sin $(pt+\theta)$.

Using the notation, $$A^{(n)}(t) = \frac{d^n}{dt^n}A(t)$$

the transient current $T(t)$ may be represented by the expression $$T(t) = E\cos\theta.g(t) + E\sin\theta.h(t) \quad\quad (3)$$

where $$g(t) = \frac{1}{p}A^{(1)}(t) - \frac{1}{p^3}A^{(3)}(t) + \cdots$$

and $$h(t) = \frac{1}{p^2}A^{(2)}(t) - \frac{1}{p^4}A^{(4)}(t) + \cdots$$

This equation of the transient current is one discussed and the method of its derivation is disclosed in the applicant's paper entitled "Theory of the transient oscillations of electrical networks and transmission systems" which was published in the Proceedings of the American Institute of Electrical Engineers, volume 38, pages 414, 415, and 473 to 475.

Since $A(t)$ represents the steady state and transient effect due to the application of unit direct current voltage, the resultant effect of a voltage $v$ would, of course, be represented by $vA(t)$.

The desired expression of the arrival curve may be obtained by substituting for $S(t)$ and $T(t)$ in equation 1 their equivalent values represented by Equations 2 and 3. Equation 1, therefore, becomes $$I(t) = E\frac{\sqrt{2}}{R_o}\sqrt{2ap}\ e^{-\sqrt{2ap}}\sin\left(pt+\theta+\phi+\frac{\pi}{4}\right)$$
$$+E\cos\theta\left(\frac{1}{p}A^1(t) - \frac{1}{p^3}A^{(3)}(t) + \cdots\right)$$
$$+E\sin\theta\left(\frac{1}{p^2}A^{(2)}(t) - \frac{1}{p^4}A^{(4)}(t) + \cdots\right)$$
$$+v\,A(t) \quad\quad\quad\quad (5)$$

The bearing of the foregoing theoretical discussion on the present invention may now be explained as follows: In the applicant's co-pending invention U. S. application Serial No. 240,631 it is shown that an improved arrival curve with consequent increased speed of signaling may be obtained by combining the actual arrival curve with several of its derivatives in correct proportions. For example, curve (2) of Figure 1 is a curve whose equation is $$I(t) = 2.33A(t) + 0.814A^{(1)}(t) + 0.0683A^{(2)}(t)$$

where $A(t)$ is the curve (1) of Figure 1. Now by reference to equation (5) the arrival curve in response to an E. M. F. E of phase $\theta$ and frequency $p/2\pi$ superposed on a direct current voltage $v$, includes the terms $$v\,A(t) + \frac{E}{p}\cos\theta\,A^{(1)}(t) + \frac{E}{p^2}\sin\theta\,A^{(2)}(t)$$

now if the constants are so chosen as to make $v, \dfrac{E}{p}\cos\theta$ and $\dfrac{E}{p^2}\sin\theta$ in the proportion of 2.33, 0.814 and 0.0683 and the frequency is so high as to make all other terms of (5) negligibly small it is evident that the arrival curve will be curve (2) instead of curve (1), which results when a direct current voltage alone is impressed. The object of the invention is therefore attained by so proportioning the applied E. M. F.'s, frequency and phase as to make the resultant arrival curve equal to the direct current arrival curve combined with properly proportioned derivatives thereof as discussed in applicant's co-pending application.

For any given values of E and $\theta$, the terms containing higher derivatives than the second are negligible when P is large, and, further, the steady state oscillations represented in absolute value by the expression $$\sqrt{2}\frac{E}{R_o}\sqrt{2ap}\cdot e^{-\sqrt{2ap}}$$

are relatively small in amplitude. Experience has shown that the magnitude of the steady state oscillations should not be more than 2% to 5% of the maximum value of the second derivative term.

As an illustration of the method of determining the voltage to be impressed, refer to Figure 1 where curve (1) is the current $A(t)$ obtained by impressing a unit direct current voltage on the long cable whose constants are:

Length $\chi$ = 1620 miles
Resistance R, per mi. = 2.74 ohms.
Capacitance C, per mi. = 0.296 microfarads Curve (2) is obtained by combining $A(t)$ and its first two derivatives as in the equation $$I(t) = 2.33A(t) + 0.814A^{(1)}(t) + 0.0683A^{(2)}(t) \quad (6)$$

This curve, it is evident, approximates the desired form of arrival current since it builds up to its maximum in a comparatively short interval of time and the maximum is fairly well sustained. To obtain such a curve by means of applying an alternating current superimposed on a direct current E. M. F. to the sending end of the cable, it is necessary and sufficient to make the right hand members of eqs. (5) and (6) equivalent. This is done by satisfying the conditions, $$v = 2.33$$
$$E \cos\theta \frac{1}{p} = 0.814$$
$$E \sin\theta \frac{1}{p^2} = 0.0683$$
$$\frac{1}{R_o}\sqrt{2ap}\,e^{-\sqrt{2ap}}\int \sin\theta \frac{1}{p^2}A(2)_{\max}(t) < .02$$

There will be an infinite number of sets of solutions satisfying the first three conditions and of these all which correspond to values of $p$ above a certain minimum will satisfy the fourth condition and give approximately the desired equation. In the following table possible sets of values are given, the steady direct current voltage $v$ being 2.33 volts.

| Sin $\theta$ | $p$ | E | Per cent ratio. $\frac{1}{R_o}\sqrt{2ap}\,e^{-\sqrt{2ap}}\int \sin\theta \frac{1}{p^2}A(2)(t)_{\max}$ |
|---|---|---|---|
| 0.9968 | 150 | 1,524 | 3.02 |
| 0.9982 | 200 | 2,750 | 0.77 |
| 0.9992 | 300 | 6,151 | 0.065 |

From the foregoing it will be seen that this invention discloses a method for correcting the distortion of submarine cable transmission which consists in impressing upon the cable a sinusoidal wave superimposed upon a direct current voltage, the values of which may be determined from the equations herein disclosed, which method of transmission assures the arrival of a wave at the receiving end having a form substantially equivalent to that shown in Fig 1 which is adapted to insure the proper operation of the receiving apparatus used in submarine cable telegraphy.

Fig. 2 shows a form of tape transmitter adapted to carry out the method of transmission which has been described heretofore. The transmitter herein shown comprises a tape 1 which moves under a wheel 2 adapted to be rotated by means of the cog wheel 3. Along the center line of the tape is a series of holes which permit the teeth of the cog wheel 3 to pass through and engage a corresponding series of holes in the rim of the wheel 2 by which the latter wheel is rotated. The tape is of the well known type in which holes on one side of the center line represent dots and those to the other side of the said line represent dashes. 4 and 5 represent plungers normally in contact with the under-surface of the tape and adapted to move upward whenever in the course of travel of the tape a hole appears above the end of the plunger. Plungers 4 and 5 are movably connected with the cranks 6 and 7 respectively, which are rotatably pivoted at points 8 and 9 respectively. The cranks 6 and 7 are adapted to close the contacts 10 and 11 respectively, which in turn control the relays by means of which the current impulses are applied to the cable. Extending across the upper edges of the cranks 6 and 7 is a rod 12 fixedly connected with the arm 13 which in turn is movably connected to arm 14 rotatably connected with the crank 15 of the shaft 16. The function of the rod 12 is to depress the cranks 6 and 7, and thereby to withdraw either of the plungers 4 or 5 from the tape at the instant when the cog wheel 3 is about to rotate the wheel 2 and thereby to advance the tape to its next position. Attached to the shaft 16 is a generator 17 adapted to produce an alternating current wave having sinusoidal form which, is intended to be superimposed on a direct current for transmission over the cable circuit. Also connected with the shaft 16 is a contact maker 18, the function of which is to close the circuit of the relay 19 at the proper instant of time with respect to the voltage wave. The relay 19 comprises the windings 20 and 21, winding 20 controlling armature 22, and winding 21 controlling armature 23. It will be seen that when the said armatures are separately operated in response to the closing of the circuits controlled by the movement of the plungers 4 and 5, impulses of opposite polarity will be applied thereby to the cable 24.

Having in mind the foregoing description of the parts of this invention, it will be more clearly understood from the following description of its mode of operation.

Let it be assumed that the tape 1 is in such position that a hole appears above the end of the plunger 4, thereby allowing the said plunger to move upward, and causing a rotation of the crank 6 about pivot 8. This movement of the crank 6 closes the contact 10, and thereby places the circuit of the winding 20 in such condition that the relay will be operated as soon as the contact maker 18 closes the circuit containing the said relay and the battery $B_1$. Since the contact maker 18 is upon the same shaft as the generator 17 it may be adjusted to close the circuit of the winding 20 as soon as the alternating current wave occupies the proper phase relationship. When this occurs, the armature 22 will close its lefthand contact, thereby grounding the negative side of the battery $B_2$, and causing the application to the cable 24 of an impulse made up of the direct current voltage of the battery $B_2$ and a superimposed alternating voltage of sinusoidal form from generator 17. As soon as this impulse has been transmitted the rod 12 will be drawn downward by the operation of the crank 15, and the plunger 4 will be withdrawn from the hole in the tape 1, thereby allowing the cog wheel 3 to move the tape forward to its next position. If the next symbol to be transmitted is a dash, the plunger 5 will move upward through the corresponding hole in the tape, thereby allowing the crank 7 to rotate around its pivot 9 and to close contact 11. As soon as the generator 17 is in proper phase relation, the contact maker 18 will close the circuit through battery $B_1$ and winding 21 of relay 19, thereby operating the armature 23. Since the armature 22 has already dropped back to its normal position, an impulse of positive polarity from the battery $B_2$ upon which the alternating wave is superimposed will be impressed upon the submarine cable 24.

From the foregoing it will be seen that this invention discloses broadly the method for distortion correction which consists in applying to a circuit, characterized by attenuation and distortion, a signaling wave having such predetermined form that after being transmitted over the said circuit will be so modified thereby as to have the form desired for operation of the signaling apparatus associated with the receiving end of the circuit. The specific method disclosed herein consists in applying to a cable circuit a direct current of predetermined potential upon which is superimposed a sine wave of predetermined characteristics which insures the arrival at the distant end of the cable of a wave having a steep front, and a well sustained maximum value adapted to operate the receiving apparatus in a satisfactory manner.

This invention also discloses means for applying to the cable the combined alternating current and direct current potentials, in such manner that the alternating current will have the proper phase relation at the instant of closing the contact of the relay that applies the impulse to the cable.

Although this invention has been disclosed as having a particular form and embodiment of parts, it is to be understood that it is capable of embodiment in other and different forms without departing from the spirit and scope of the appended claims.

What is claimed is:

1. The method of signaling over a transmission circuit characterized by great distortion, which consists in superimposing a sinusoidal voltage upon a direct current voltage, and impressing the resultant voltage upon the said transmission circuit at the instant when the sinusoidal voltage is of the predetermined phase to produce at the receiving end of the said circuit an arrival wave having a relatively steep front.

2. The method of signaling over a transmission circuit characterized by great distortion, which consists in superimposing a sinusoidal voltage upon a direct current voltage, and applying impulses of the resultant voltage to the said transmission circuit, the application of the said impulses being so controlled that the sinusoidal voltage will be of a predetermined phase at the instant of application of each of said impulses to the said transmission circuit.

3. The method of transmitting telegraphic signals over cables characterized by great attenuation and distortion which consists in impressing upon the cable signaling impulses consisting of a sinusoidal voltage wave superimposed on a direct current voltage and controlling the phase angle of the sinusoidal wave with respect to the time of application of the impulse to the cable.

4. In a signaling system the combination with a transmission line, of means for impressing simultaneously thereon a sinusoidal voltage wave and a direct current voltage, and means for automatically controlling the phase angle of the sinusoidal wave with respect to the time of application of the said sinusoidal wave and said direct current voltage to the transmission line.

5. In a signaling system the combination with a transmission line of means for impressing simultaneously thereon a sinusoidal voltage wave and a direct current voltage, means for generating the said sinusoidal wave and circuit controlling means fixedly associated with the said generating means whereby the application of the sinusoidal wave and the direct current voltage to the transmission line will be effective only when the sinusoidal wave has a predetermined phase angle.

6. In a signaling system the combination with a transmission line of a tape transmitter, a source of direct current and sinusoidal voltages adapted for connection with the said transmission line, and a contact maker fixedly related with the source of the said sinusoidal wave and designed to control the operation of the circuit for impressing the said direct current and sinusoidal voltages upon the said transmission line.

7. The method of transmitting signals over a line circuit characterized by great distortion which consists in generating a direct current voltage and a sinusoidal alternating current voltage and withholding the application of the combined voltages to the said line circuit until the alternating voltage has a predetermined phase angle with respect to the time of application of the combined voltages to the said line circuit.

8. The method of signaling over a transmission circuit characterized by great distortion, which consists in superimposing a sinusoidal voltage of maximum value E and frequency $p$ upon a direct current voltage $v$ and applying impulses of the resultant voltage to the said transmission circuit only when the sinusoidal voltage has a phase angle $\theta$ so that the curve of the arrival current resulting from the said impulses will satisfy the equation:

$$I(t) = v\ A(t) + \frac{E}{p} \cos \theta\ A^{(1)}(t) + \frac{E}{p^2} \sin \theta\ A^{(2)}(t)$$

9. The method of signaling over a transmission circuit characterized by great distortion, which consists in superimposing a sinusoidal voltage of maximum value E and frequency $p$ upon a direct current voltage $v$, and applying the resultant voltage to the said transmission circuit only when the sinusoidal voltage has a phase angle $\theta$, the constants E, $p$, $b$, and $\theta$ being so chosen that $$v = 2.33,\ \frac{E}{p} \cos \theta = 0.814 \text{ and } \frac{E}{p^2} \sin \theta - 0.0683$$

whereby the arrival current curve resulting from the said impulses will satisfy the equation:

$$I(t) = 2.33\ A(t) + 0.814\ A^{(1)}(t) + 0.0683\ A^{(2)}(t)$$

In testimony whereof, I have signed my name to this specification this 6th day of July 1920.

JOHN R. CARSON.